United States Patent [19]

Morgan

[11] 4,133,974

[45] Jan. 9, 1979

[54] SYSTEM FOR LOCALLY ENCIPHERING PRIME DATA

[75] Inventor: Barrie O. Morgan, Dallas, Tex.

[73] Assignee: Datotek, Inc., Dallas, Tex.

[21] Appl. No.: 741,502

[22] Filed: Nov. 5, 1976

[51] Int. Cl.$^2$ ............................................. H04L 9/02
[52] U.S. Cl. ...................................... 178/22; 178/69.1
[58] Field of Search .............................. 178/22, 69.1; 179/1.5 R

[56] References Cited

U.S. PATENT DOCUMENTS

| | | | |
|---|---|---|---|
| 1,479,846 | 1/1924 | Vernam | 178/22 |
| 3,659,046 | 4/1972 | Angeleri et al. | 178/22 |
| 3,694,757 | 9/1972 | Hanna, Jr. | 178/22 |
| 3,781,473 | 12/1973 | Goode et al. | 178/22 |
| 3,893,031 | 7/1975 | Majeau et al. | 179/1.5 R |
| 3,936,601 | 2/1976 | Obeginski | 178/22 |

Primary Examiner—Howard A. Birmiel
Attorney, Agent, or Firm—Richards, Harris & Medlock

[57] ABSTRACT

The specification discloses circuitry useful in a digital cryptographic system having a digital prime sequence which controls the generation of randomized key data. The circuitry includes a register for storing the digital prime sequence prior to generation of the randomized key data. A memory is provided which includes address inputs and data outputs and which stores predetermined digital relationships. A stage of the register is connected to an address input of the memory to select one of the stored digital relationships. A source of selectable digital bits is connected to another address input of the memory. The data outputs of the memory are operable to be coupled to the input of the register for generating an enciphered digital prime sequence. A clock clocks the contents of the register through the stages of the register in order to cause the enciphered digital prime sequence to be loaded into the register. The enciphered prime sequence is then utilized to control the generation of randomized data for use in the cryptographic system.

14 Claims, 2 Drawing Figures

SYSTEM FOR LOCALLY ENCIPHERING PRIME DATA

FIELD OF THE INVENTION

This invention relates to digital cryptographic systems, and more particularly relates to systems for enciphering digital prime sequences prior to the generation of randomized key data streams.

THE PRIOR ART

Digital cryptographic systems are frequently utilized in numerous present day environments such as banking and other business enterprises. In a typical digital cryptographic system, uncoded or "clear text" digital data is applied to an enciphering unit. A long stream of randomized or pseudo-random digital bits, termed "key data" is generated by a random code generator and is also applied to the enciphering unit. The enciphering unit then enciphers the clear text data in response to the key data in order to generate an unintelligible enciphered digital stream. This enciphered digital stream is transmitted via a wire or radio data link to a deciphering unit. At the deciphering unit, a second identical random code generator generates an identical stream of randomized key data which is utilized in the deciphering unit in order to decipher the enciphered digital data. Decoded plain text data is thus generated for normal use. The advantage of such a cryptographic system is that an unauthorized party intercepting the enciphered digital data would not be able to understand the original plain text data. Examples of such prior enciphering systems are disclosed in U.S. Pat. No. 3,522,374, issued July 28, 1970 and in U.S. Pat. No. 3,781,472, issued Dec. 25, 1973.

For such enciphering and deciphering units to work properly, the random code generators at each station must be identical and also must be started at the identical point of their operational cycle in order that identical key data streams are generated at each station. Only in this way can the data be enciphered and properly deciphered at the two remote stations. In order to ensure that both random code generators begin operation at the same point of their operational cycle, it has heretofore been known to generate a sequence of digital bits, known as "prime data" or "message key data". This prime data is utilized to control the starting point of operation of the random code generator at the enciphering station and the prime data is then transmitted over the data link to the deciphering station, whereupon it is also utilized to control the starting point of the operation of the random code generator at the deciphering station. A description of the generation and use of such prime data is disclosed in U.S. Pat. No. 3,781,472, among others.

While the use of such prime data has long worked well in practice, it is subject to the disadvantage that an unauthorized person would be able to obtain the prime data by tapping into the data link, inasmuch as the prime data is required to be transmitted over the data link prior to the deciphering operation. It is the purpose of the present invention to overcome this disadvantage by performing enciphering operations upon the prime data both at the enciphering and deciphering station. Hence, an unauthorized party would not be able to contain the actual prime data which was utilized to initiate the starting operation of the random code generators, and the system would be made much more secure.

DESCRIPTION OF THE DRAWINGS

For a more detailed understanding of the present invention and for further advantages and objects thereof, reference is now made to the following description taken in conjunction with the accompanying drawings, in which.

DESCRIPTION OF THE PREFERRED EMBODIMENTS

Figure 1:
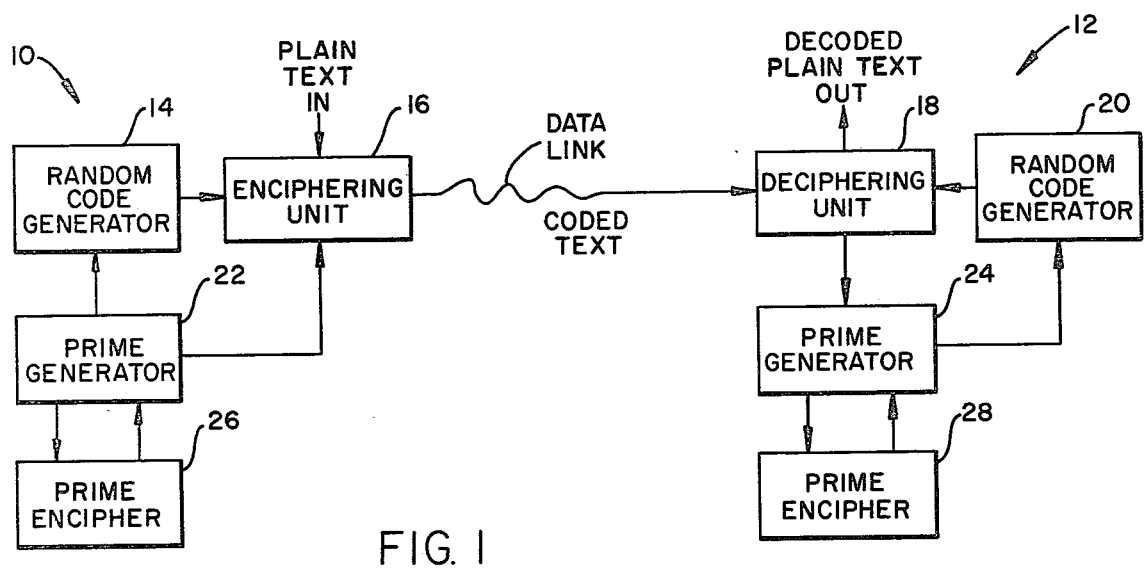
FIG. 1 is a block diagram of a digital cryptographic system incorporating the prime enciphering operation of the present invention.

Referring to FIG. 1, a block diagram of a typical enciphering system utilizing the present invention is presented. The system includes an enciphering and transmitting station generally designated by the numeral 10 and a receiving and deciphering station generally identified by the numeral 12. As is well-known, the stations 10 and 12 may be located at great distances apart and may be interconnected by digital data transmission lines, such as teleprinter data lines or the like. Alternatively, digital signals may be transmitted via a radio link between the stations.

In operation, the station 10 enciphers an original uncoded digital message, commonly termed "plain text" and transmits it to the remote station 12. At the receiving and deciphering station 12, the enciphered data is received and deciphered such that the original plain text may be read. Any unauthorized party attempting to intercept the data along the data link between the two stations would receive only a garbled unintelligible digital group, due to the encipherment provided by the present system.

The present invention provides enciphering and deciphering in the conventional manner. A random code generator 14 generates a long stream of randomized or pseudo-random digital bits, commonly termed key data. The key data is applied to an enciphering unit 16 which also receives plain digital text. Enciphering unit 16 enciphers the plain text in dependency upon the key data and generates a coded text digital signal which is applied to the transmission link to the remote station 12. For example, the enciphering unit 16 may modulo-2 add the randomized key stream with the plain text in order to provide encipherment.

At the deciphering station 12, the enciphered text is applied to a deciphering unit 18 which also receives a randomized key stream from a random code generator 20. The key stream applied to the deciphering unit 18 is the identical key stream applied from the random code generator 14 to the enciphering unit 16. Consequently, the deciphering unit 18 operates upon the enciphered text in dependency upon the randomized key stream to generate decoded plain text which corresponds exactly with the plain text originally applied to the enciphering unit 16. Such encipherment of digital data is described in such patents as U.S. Pat. No. 3,522,734, issued July 28, 1970 and U.S. Pat. No. 3,781,472, issued Dec. 25, 1973, among many others.

Generally, such digital enciphering and deciphering systems utilize identical random code generators at the enciphering and deciphering stations. Consequently, if the random code generators at the enciphering and deciphering stations are started at the same point of operation, then both of the random code generators generate identical randomized key streams. Such operation of generating identical key streams is essential for the correct operation of the system. Consequently, it has heretofore been known to provide a technique for ensuring that the enciphering random code generator begins operation at the same point and in the same manner as the deciphering random code generator.

One technique for accomplishing this operation has been the use of a circuit, herein termed a prime generator 22, for generating a predetermined number of digital bits which are utilized to control the operation of the random code generator 14 in order to determine the starting point of operation of the random code generator 14. The digital bits generated by the prime generator 22 are also applied through the enciphering unit 16 and are transmitted via the transmission link through the deciphering unit 18 to a prime generator 24 located at the enciphering station 12. The prime generator 24 stores the prime bits generated by the prime generator 22 and controls the operation of the random code generator 20 with the stored prime bits.

In this manner, the random code generator 20 begins operation at the same point and in the same manner as does the random code generator 14, such that the identical key data is generated at both stations. Such generation of prime data is disclosed in a number or prior patent applications as, for example, in U.S. Pat. No. 3,781,472, previously identified. The prime data may be manually selected at random by the operator of the system by the use of external pinboards, or by other techniques. Such prime data is generally transmitted from the enciphering system over the data link to the deciphering station prior to the transmission of enciphered data.

In such prior enciphering systems described above, an inherent weakness in the security of such systems exists because of the fact that an unauthorized party could tap the transmission link and obtain the prime data being transmitted from the enciphering station to the deciphering station. While obtaining such prime data would not enable immediate deciphering of the transmitted message, it nevertheless would provide some information which could be useful to breaking the overall security of the system. Consequently, the present invention provides a technique which enhances the security of a digital encipherment system by providing encipherment of the prime data. Thus, with the present system, if an unauthorized party obtains the transmitted prime data, the unauthorized party would still not have the actual prime data utilized to initiate the starting operation of the random code generators of the system.

Referring to FIG. 1, a prime encipher circuit 26 is connected to receive the prime data generated from the prime generator 22 and to apply an enciphered prime back to the prime generator 22, as will be subsequently described in greater detail. Correspondingly, a prime encipher circuit 28 is connected to receive the prime data stored in the prime generator 24 and to apply an enciphered prime back to the prime generator 24. The prime encipher circuits 26 and 28 are identical in construction and in operation.

In operation, the prime generator 22 generates a sequence of prime data and transmits the prime data through the enciphering unit 16, over the data link to the deciphering unit 18 and to the prime generator 24 wherein the prime data is stored. Simultaneously, the prime generator 22 applies the generated prime data to the prime encipher circuit 26, which randomly enciphers the prime data and applies the enciphered prime data back to the prime generator 22. Similarly, the prime data stored in the prime generator 24 is applied to the prime encipher circuit 28 which enciphers the prime data. The enciphered prime data is then applied back to the prime generator 24 for storage.

The prime generator 22 thereafter applies the enciphered prime data in order to control the starting point and operation of the random code generator 14. Similarly, the prime generator 24 applies the enciphered prime data to control the starting point and operation of the random code generator 20. Thus, the random code generator 14 starts at the same point and operates in the same manner as does the random code generator 20, such that identical key data is generated at both the enciphering and deciphering stations. It will of course be understood that, in actual operation, each station 10 and 12 would include both enciphering and deciphering stages which may be selected to enable enciphering and deciphering operations to be accomplished at either station.

Figure 2:
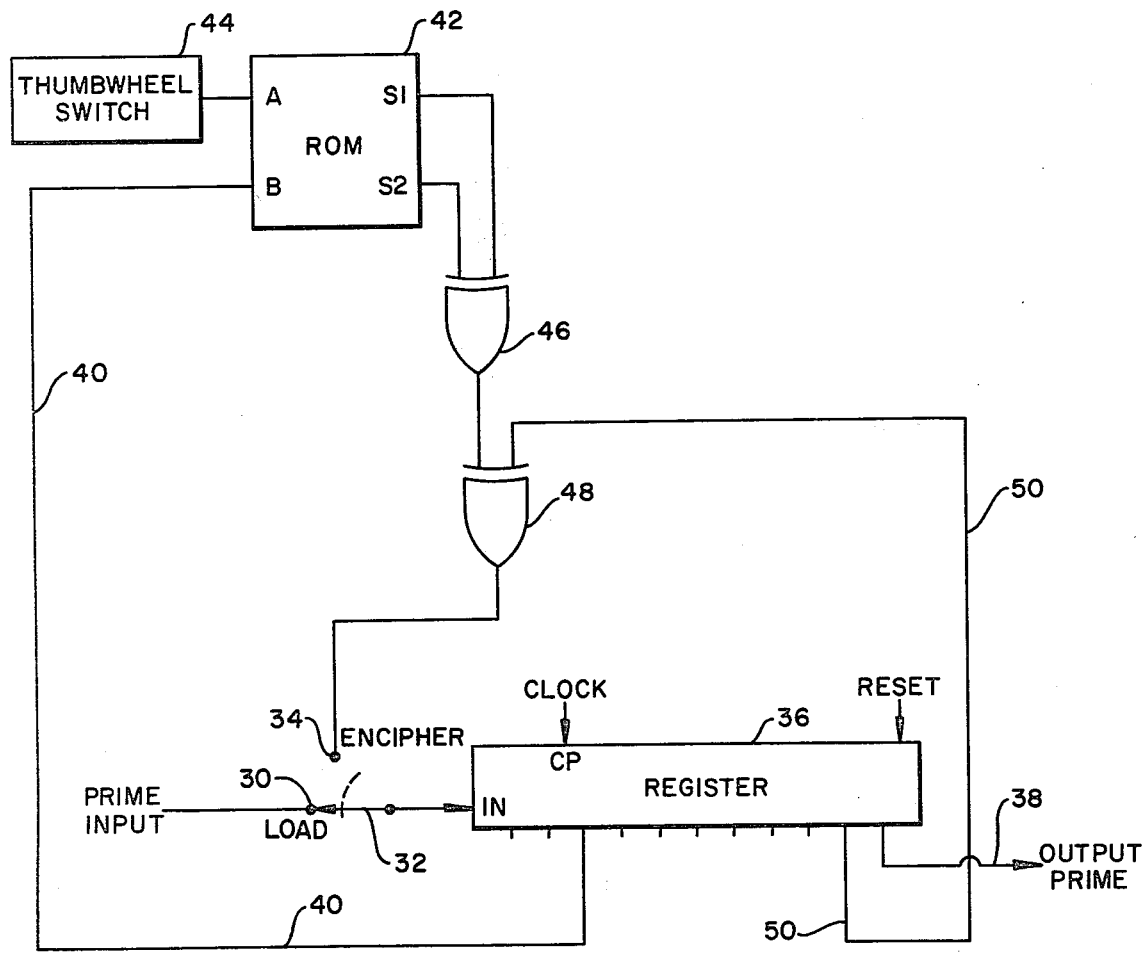
FIG. 2 is a schematic diagram of the preferred embodiment of a prime enciphering circuit in accordance with the present invention.

Referring to FIG. 2, a schematic diagram of a prime enciphering circuit according to the invention is illustrated. The prime data generated by either the prime generator 22 or stored in the prime generator 24 is applied as prime input to a load terminal 30. A mode selection switch 32 is operable between the load terminal 30 and an encipher terminal 34 in order to select the desired operation of the circuit. It will be understood that the switch 32 in practice may comprise an electronic switch circuit controlled by a controller circuit of the enciphering system. The switch arm 32 is connected to the input of a register 36 which receives and stores the prime data generated by the prime generator. The length of the register 36 is dependent upon the number of digital bits comprising the prime data.

The data stored within the register 36 may be clocked through the various stages of the register by a clock signal applied to the CP terminal of the register in the well-known manner. The data stored in the register 36 may be reset by the application of a reset signal applied to the reset terminal of the register also in the well-known manner. The last bit stage of the register is connected to an output prime lead 38 in order to apply the enciphered prime data back to either the prime generator 22 or the prime generator 24 as previously described.

A stage of the register 36 is connected via a lead 40 to an address input of a read only memory (ROM) 42. While the third stage of the register 36 is illustrated as being connected to ROM 42, it will be understood that any other suitable stage may be alternatively connected. The other address input of the ROM 42 comprises a thumbwheel switch 44, or any other suitable source of variable binary or key data. In this manner, the operator of the enciphering and deciphering system may set an external or internal switch in order to provide additional levels of security to the system. The two outputs of the ROM 42 are applied to an exclusive OR gate 46, the output of which is applied as an input to a second exclusive OR gate 48. Another output stage of the register 36 is connected via lead 50 as the second input of the exclusive OR gate 48. The output of gate 48 is applied to the encipher terminal 34.

The ROM 42 is illustrated as a two-by-four ROM, although it will be understood that more complex ROMs may be utilized to provide additional complexity to the enciphering provided. For example, one or more additional address inputs could be applied to the ROM by use of additional thumbwheel switches or other exterior sources of binary input. Additional outputs could then be applied from the ROM and modulo-2 added with one another to provide additional enciphering complexity. In the embodiment shown, the selected binary outputs from the thumbwheel switch 44 and from lead 40 extending from register 36 are utilized as addresses for the stored data within the ROM.

An example of a possible address and data storage configuration for the ROM 42 is illustrated below:

TABLE I

| A | B | S1 | S2 |
|---|---|----|----|
| 0 | 0 | 1  | 0  |
| 0 | 1 | 1  | 1  |
| 1 | 0 | 0  | 1  |
| 1 | 1 | 0  | 0  |

It will be understood that ROMs having greater storage capability may be utilized to provide greater code complexity. An important aspect of the invention is that the addressing and data storage of the ROMs are in non-linear relationships such that there is no linear relationship between the addressing of the ROM and the output of the ROM, in order to provide additional security to the system.

In operation of the system, it will be first assumed that the prime enciphering system shown in FIG. 2 comprises the prime enciphering circuit 26 used in the enciphering unit during the enciphering mode. The prime generator 22 generates a prime word having the same number of bits as the storage capacitor of register 36. The switch arm 32 is initially moved to contact the load terminal 30 such that the prime data is applied into the input of register 36 and stored therein. At this time, the generated prime from the prime generator 22 is transmitted over the data link to the remote deciphering station for storage in the prime generator 24. Subsequently, the switch arm 32 is then moved into contact with the enciphered terminal 34 and the clock begins to clock the data stored in the register 36 through the stages of the register. Data is thus applied through the lead 40 to the address of the ROM 42, causing in conjunction with the data applied from the thumbwheel switch 44, the data stored in the ROM 42 to be applied to the inputs of the exclusive OR gate 46.

The outputs of the ROM 42 are thus modulo-2 added and are applied as an input to the gate 48. The data being clocked to the register 36 is also applied via lead 50 to the input of the gate 48. The inputs to the gates 48 are modulo-2 added and are applied as enciphered prime data through the terminal 34 and the switch arm 32 and are loaded back in the input of the register 36. The new data loaded into the register 36 is enciphered prime data. The data originally stored in register 36 is thus clocked completely through the register 36 for a number of clock pulses equal to the number of stages of the register 36, such that the register 36 at the end of the enciphering mode is filled with an enciphered prime word. The enciphered prime word is then output via lead 38 for use in controlling the starting point in operation of the random code generator 14 is order to generate the key data.

At the deciphering station 12, a similar prime enciphering mode has also been accomplished. The prime data stored in the prime generator 24 is applied as the prime input to the load terminal 30 and is loaded into register 36. The switch arm 32 is then moved to the enciphered mode and the stored prime data is then cycled through the register 36 and enciphered with the data contained within the ROM 42 and loaded back into the register 36 as an enciphered prime word. The enciphered prime word is then reapplied to the prime generator 24 which applies the enciphered prime word to control the starting point in operation of the random code generator 20. Consequently, the random code generators 14 and 20 are started at the same point in their operation in order to generate identical key data to enable enciphering and deciphering of the data in the well-known manner.

While only a single storage register 36 is illustrated in the present invention, it will be understood that a plurality of registers may be serially interconnected in order to operate in the manner described. Similarly, a more complex ROM and more complex inputs may be applied to such ROM in order to provide additional sophistication to the enciphering of the prime data stored in the register 36.

An important aspect of the invention is that the enciphering of the prime data is a function of the prime data itself, as well as a function of the input from thumbwheel switches 44 and the data contained within the ROM 42.

With the use of the present invention, the starting point of the enciphering and deciphering systems are not divulged by the transmission of the prime data. Since the prime data is generated, transmitted and then enciphered, nothing is divulged by the knowledge of the transmitted prime data. The use of the prime data as a part of the encipherment of itself does not compromise the security of the system, inasmuch as the enciphered version of the prime data is not transmitted but is totally contained within the system. Because the data stored within the ROM 42 is designed to be non-linear, the ROM 42 provides substantial amount of security in the encipherment of the prime.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a digital cryptographic system having a digital prime sequence for controlling the generation of randomized key data at a local station and at a remote station, the combination comprising:
   means for transmitting the digital prime sequence from the local station to the remote station,
   multistage means for storing the digital prime sequence at the local station prior to generation of the randomized key data,
   means responsive to a portion of said stored prime sequence for enciphering said stored prime sequence,
   means for replacing the contents of said multistage means with said enciphered prime sequence, and
   means for applying the contents of said multistage means to control the generation of the randomized key data.

2. The improvement of claim 1 and further comprising:
   storage means for controlling the encipherment of said prime sequence according to a stored non-linear numeric relationship addressed in response to said portion of said stored prime sequence.

3. The improvement of claim 2 wherein said storage means comprises a read only memory.

4. The improvement of claim 3 wherein at least one of the addresses of said memory is controlled by a portion of said prime sequence.

5. The improvement of claim 3 wherein at least one of the addresses of said memory is controlled by a selectable source of digital signals.

6. In a digital cryptographic system having a digital prime sequence for controlling the generation of randomized key data, the combination comprising:
   register means for storing the digital prime sequence prior to generation of the randomized key data,
   memory means having address inputs and data outputs and storing predetermined digital relationships,
   a stage of said register means being connected to an address input of said memory means for selecting ones of said stored digital relationships.
   a source of selectable digital bits connected to another address input of said memory means,
   said data outputs of said memory means operable to be coupled to the input of said register means for generating an enciphered digital prime sequence, and
   means for clocking the contents of said register means through the stages of said register means in order to cause said enciphered digital prime sequence to be loaded into said register means.

7. The combination of claim 6 wherein said register means has the same number of stages as the number of digital bits within said prime sequence.

8. The combination of claim 6 wherein a stage of said register means is modulo-2 added to a signal representative of said data outputs of said memory means.

9. The combination of claim 6 wherein said data outputs are modulo-2 added to one another.

10. The combination of claim 6 and further comprising:
    means for selectively connecting the input of said register means to receive either said prime sequence or said enciphered prime sequence.

11. The combination of claim 6 wherein said source of selectable digital bits comprises a manually operable set of switches for generating a sequence of digital signals.

12. The combination of claim 6 wherein said memory means comprises a read only memory.

13. The combination of claim 6 wherein said stored predetermined digital relationships are non-linear to one another.

14. In a ditigal cryptographic system having a digital prime sequence for controlling the generation of randomized key data, the combination comprising:
    multistage means for storing the digital prime sequence prior to generation of the randomized key data,
    memory means having address inputs and data outputs and storing predetermined digital relationships,
    a stage of said multistage means being connected to an address input of said memory means for selecting ones of said stored digital relationships,
    said data outputs of said memory means operable to be coupled to the input of said multistage means for generating an enciphered digital prime sequence, and
    means for replacing the contents of said multistage means with said enciphered digital prime sequence.

* * * * *